US005980236A

United States Patent [19]

Gellert et al.

[11] Patent Number: 5,980,236

[45] Date of Patent: Nov. 9, 1999

[54] INJECTION MOLDING APPARATUS HAVING NOZZLES WITH ELONGATED MOUNTING FLANGES

[75] Inventors: Jobst Ulrich Gellert, Georgetown; Denis L. Babin, Acton, both of Canada

[73] Assignee: Mold-Masters Limited, Georgetown, Canada

[21] Appl. No.: 09/100,989

[22] Filed: Jun. 22, 1998

[30] Foreign Application Priority Data

May 29, 1998 [CA] Canada .................................. 2239349

[51] Int. Cl.[6] .................................................... B29C 45/22

[52] U.S. Cl. ...................... 425/549; 264/328.8; 425/570; 425/572

[58] Field of Search .................................... 425/549, 570, 425/572; 264/328.8

[56] References Cited

U.S. PATENT DOCUMENTS 5,282,735 2/1994 Gellert .
5,429,491 7/1995 Gellert .

*Primary Examiner*—Tim Heitbrink
*Attorney, Agent, or Firm*—Dalesman & Company

[57] ABSTRACT

Injection molding apparatus having a number of heated nozzles extending in a row from an elongated heated melt distribution manifold. Each heated nozzle has a pair of mounting flanges extending outwardly in opposite directions adjacent its rear end. Hollow insulating and locating bushings extend forwardly from the mounting flanges to the cooled cavity plate. The combination of the mounting flanges and the insulating and locating bushings accurately locates the heated nozzles very closely together in a row and spaces the heated elongated melt distribution manifold rearwardly from the cooled cavity plate.

6 Claims, 3 Drawing Sheets

INJECTION MOLDING APPARATUS HAVING NOZZLES WITH ELONGATED MOUNTING FLANGES

BACKGROUND OF THE INVENTION

This invention relates generally to multiple nozzle injection molding apparatus and more particularly to such apparatus wherein a number of nozzles extend from an elongated melt distribution manifold and each nozzle has an elongated mounting flange from which two locating and insulating bushings extend into the mold on opposite sides of the nozzle.

Injection molding apparatus having a number of heated nozzles extending from an elongated heated melt distribution manifold into a cooled mold are well known. As seen in U.S. Pat. No. 5,282,735 to Gellert which issued Feb. 1, 1994, in some applications the front end of the nozzle is located in the mold and the rear end of the nozzle is attached to the melt distribution manifold by being screwed into it. However, in most applications, it is necessary to locate both the front and rear ends of the nozzle in the mold to allow the melt distribution manifold to move slightly relative to the rear end of the nozzles to allow for heat expansion and contraction of the elongated melt distribution manifold. As shown for instance in U.S. Pat. No. 5,429,491 to Gellert which issued Jul. 4, 1995, this is usually achieved by the nozzle having an outer cylindrical collar portion which is either an integral part of the nozzle or removable and sits against a circular seat in the mold. However, these previous nozzles with a cylindrical collar portion have the disadvantage that the cylindrical collar portions prevent the pitch between adjacent nozzles or cavities along the elongated melt distribution manifold being reduced as much as desired.

SUMMARY OF THE INVENTION

Accordingly, it is an object of the present invention to at least partially overcome the disadvantages of the prior art by providing multiple nozzle injection molding apparatus wherein each nozzle has an elongated mounting flange at its rear end which allows the pitch between adjacent nozzles or cavities to be further reduced.

To this end, in one of its aspects, the invention provides a multi-cavity injection molding apparatus having a plurality of heated nozzles extending in a row into a cooled mold from an elongated heated melt distribution manifold. Each heated nozzle has a rear end and an elongated main portion with a generally cylindrical outer 5 surface and a melt bore extending therethrough to convey melt to a gate leading to a cavity. The melt distribution manifold has a melt passage extending therethrough with a number of branches extending outwardly from a common inlet portion. Each branch is aligned with the melt bore extending through one of the heated nozzles. The cooled mold includes a cooled cavity plate having a rear surface and an opening therein into which the heated nozzles extend. The opening has a surface which is spaced from the outer surfaces of the main portions of the heated nozzles. Each heated nozzle has an elongated flange portion with a front surface which provides a pair of mounting flanges extending outwardly in opposite directions adjacent the rear end of the heated nozzle. An insulating and locating bushing extends between each mounting flange and the cooled cavity plate to accurately locate the heated nozzle and space the front surface of the flange portion from the rear surface of the cooled cavity plate.

Further objects and advantages of the invention will appear from the following description taken together with the accompanying drawings.

DETAILED DESCRIPTION OF THE INVENTION

Figure 1:
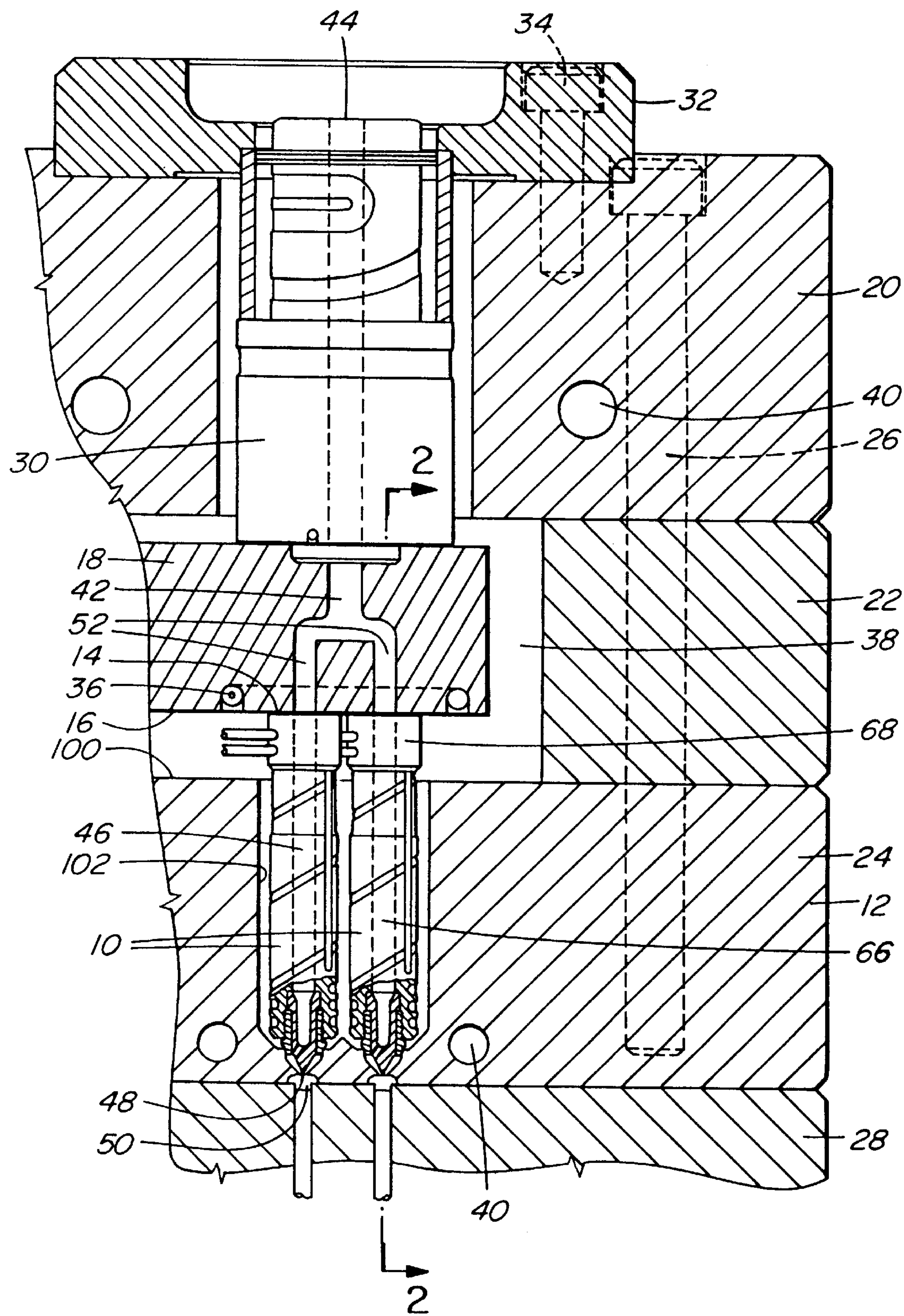
FIG. 1 is a sectional view of a portion of a multi-cavity injection molding apparatus wherein each heated nozzle has an elongated flange portion and is located by insulating and locating bushings according to a preferred embodiment of the invention.
Figure 2:
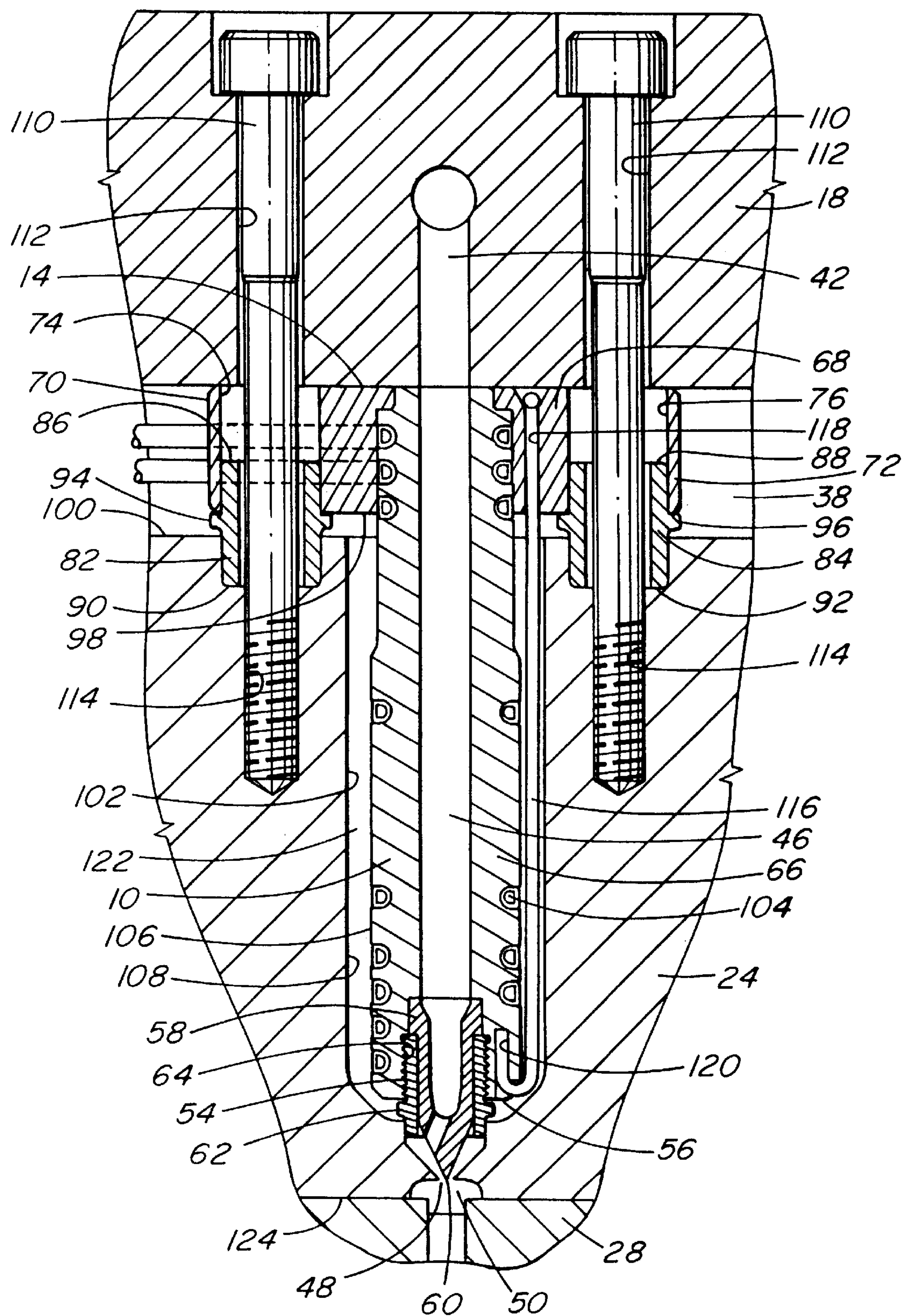
FIG. 2 is a sectional view along line 2—2 in FIG. 1.

Reference is first made to FIGS. 1 and 2 which show a multi-cavity injection molding apparatus or system wherein a number of heated nozzles 10 are mounted in a row in a mold 12 with their rear ends 14 extending from the front face 16 of a heated elongated melt distribution manifold 18. While only two heated nozzles 10 are shown for ease of illustration, normally this type of apparatus will have a larger number of heated nozzles 10 extending in a row from the heated elongated melt distribution manifold 18. Similarly, while the mold 12 can have a greater number of plates depending upon the application, in this case, only a top clamp plate 20, manifold plate 22 and a cavity plate 24 secured together by bolts 26, as well as a core plate 28 are shown for ease of illustration.

The elongated melt distribution manifold 18 has an inlet portion 30 which is surrounded by a locating ring 32 secured to the top clamp plate 20 by screws 34. The elongated melt distribution manifold 18 is heated by an integral electrical heating element 36 and separated by an insulative air space 38 from the surrounding mold 12 which is cooled by pumping a cooling fluid such as water through cooling channels 40.

A melt passage 42 extends from an inlet 44 in the inlet portion 30 of the elongated melt distribution manifold 18 and branches to extend through a central melt bore 46 in each heated nozzle 10 to gates 48 leading to cavities 50. Each branch 52 of the melt passage 42 extends through a two-piece nozzle seal 54 mounted in the front end 56 of one of the nozzles 10. Each two-piece nozzle seal 54 has an inner piece 58 with a pointed tip 60 aligned with one of the gates 48 and an outer piece 62 which is screwed into a threaded seat 64 in the front end 56 of the nozzle 10 to hold the inner piece 58 in place.

Figure 3:
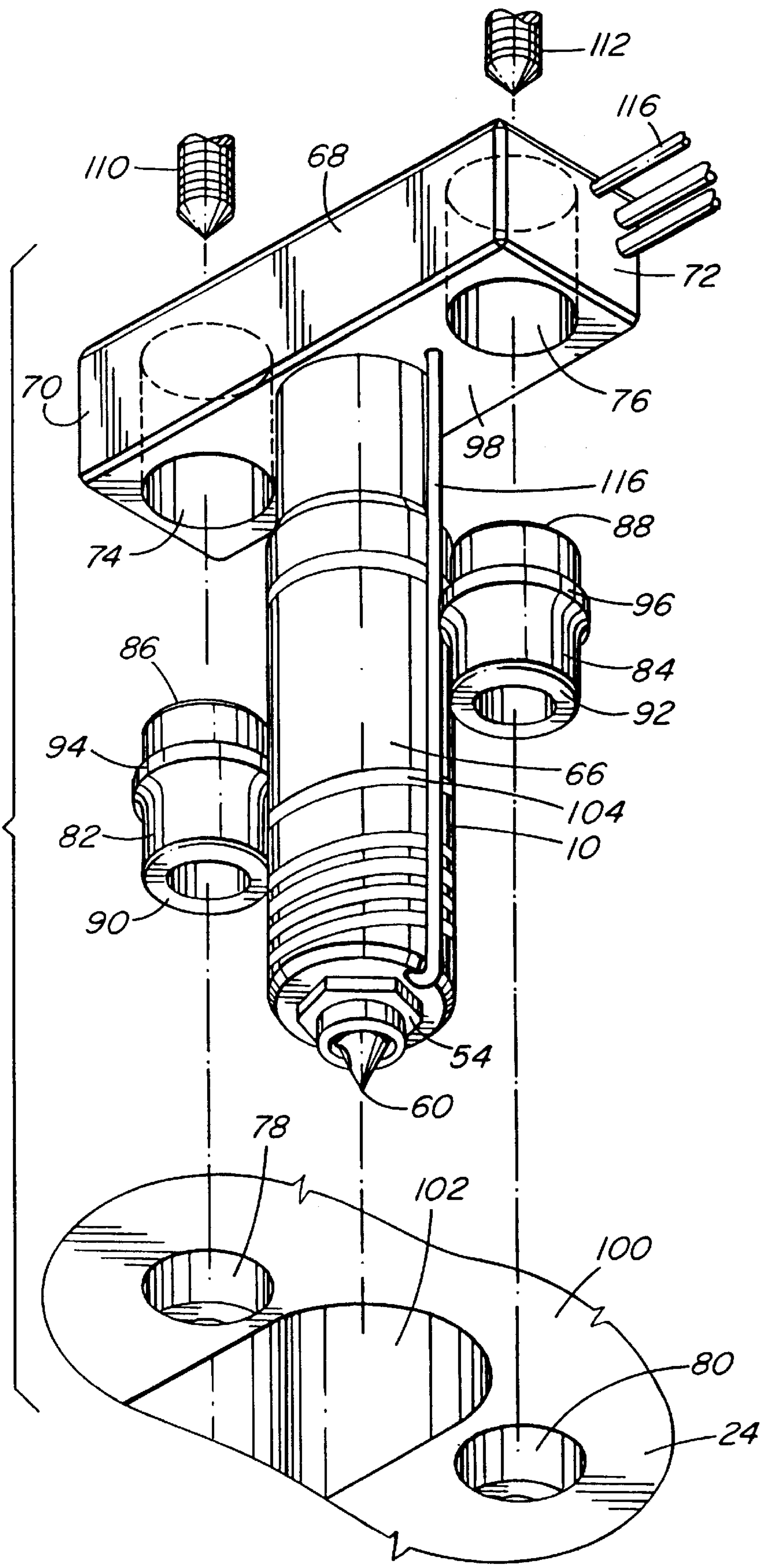
FIG. 3 is an isometric view of the same nozzle and insulating and locating bushings in position for assembly.

As seen in FIGS. 2 and 3, each heated nozzle 10 has a steel elongated main portion 66 and a steel elongated flange portion 68 which are integrally brazed together in a vacuum furnace. The elongated flange portion 68 forms a pair of mounting flanges 70, 72 extending outwardly in opposite directions adjacent the rear end 14 of the heated nozzle 10. The mounting flanges 70, 72 each have openings 74, 76 extending therethrough in alignment with matching seats 78, 80 in the cavity plate 24. Matching steel insulating and locating bushings 82, 84 have rear ends 86, 88 extending into the openings 74, 76 in the mounting flanges 70, 72 and front ends 90, 92 extending into the matching seats 78, 80 in the cavity plate 24. In this embodiment, the insulating and locating bushings 82, 84 have outwardly extending shoulders 94, 96 against which the front surface 98 of the flange portion 68 abuts to space the front surface 98 of the flange portion 68 from the rear surface 100 of the cooled cavity plate 24. The insulating and locating bushings 82, 84 locate the heated nozzles 10 with their elongated main portions 66 extending into an opening 102 in the cavity plate 24, with the pointed tip 60 of each two-piece seal 54 accurately aligned with one of the gates 48. The elongated main portion 66 of each heated nozzle 10 has an integral electrical heating element 104 extending around the melt bore 46 extending therethrough and a generally cylindrical outer surface 106 which is spaced from the surrounding surface 108 of the opening 102 in the cooled cavity plate 24. Thus, the combination of each heated nozzle 10 having the mounting flanges 70, 72 extending in opposite directions and the insulating and locating bushings 82, 84 extending from the mounting flanges 70, 72 on opposite sides of the opening 102 in the cavity plate 24 allows the heated nozzles 10 to be accurately located and positioned very closely together in a row, and the heated elongated melt distribution manifold 18 to be spaced rearwardly from the cooled cavity plate 24.

In this embodiment, the insulating and locating bushings 82, 84 are hollow and screws 110 extend therethrough from holes 112 through the elongated melt distribution manifold 18 into threaded bores 114 in the cavity plate 24. This securely mounts the elongated melt distribution manifold 18 in place with the insulative air space 38 extending between it and the surrounding cooled mold 12. However, the holes 112 through the elongated melt distribution manifold 18 are sufficiently larger in diameter than the diameter of the mounting screws 110 to allow the elongated melt distribution manifold 18 to slide relative to the cavity plate 24 sufficiently to allow for thermal expansion and contraction of the elongated melt distribution manifold 18. A thermocouple element 116 extends through a hole 118 in the flange portion 68 of the heated nozzle 10 and through the insulative air space 122 around each heated nozzle 10 forwardly into an opening 120 in its front end 56 to monitor the operating temperature.

In use, the system is assembled as shown in FIGS. 1 and 2 with the heated nozzles 10 mounted very closely together and the insulating and locating bushing 82, 84 extending on opposite sides of the opening 102 in the cavity plate 24. After assembly, electrical power is applied to the electrical heating elements 36, 104 in the elongated melt distribution manifold 18 and the heated nozzle 10 to heat the melt distribution manifold 18 and the nozzles 10 to a predetermined injection operating temperature. Pressurized melt is then applied from a molding machine (not shown) to the inlet 44 to the melt passage 42 according to a predetermined injection cycle. The melt flows through the elongated melt distribution manifold 18, nozzles 10, and gates 48 into the cavities 50. After the cavities 50 are filled and a suitable packing and cooling period has expired, injection pressure is released. The mold 12 is then opened along the parting line 124 to eject the molded product. After ejection, the mold 12 is closed and the cycle is repeated continuously every 15 to 30 seconds with a frequency depending upon the wall thickness and the number and size of the cavities 50 and the exact material being molded.

While the description of the injection molding apparatus with the heated nozzles 10 having a pair of flanges 70, 72 and insulating and locating bushings 82, 84 extending on opposite sides of the opening 102 in the cavity plate 24 has been given with respect to a preferred embodiment, it will be evident that various modifications are possible without departing from the scope of the invention as understood by those skilled in the art and as defined in the following claims.

The embodiments of the invention in which an exclusive property or privilege is claimed is defined as follows:

1. In a multi-cavity injection molding apparatus having a plurality of heated nozzles extending in a row into a cooled mold from an elongated heated melt distribution manifold, each heated nozzle having a rear end and an elongated main portion with a generally cylindrical outer surface and a melt bore extending therethrough to convey melt to a gate leading to a cavity, the melt distribution manifold having a melt passage extending therethrough, the melt passage having a plurality of branches extending outwardly from a common inlet portion, each branch being aligned with the melt bore extending through one of the heated nozzles, the cooled mold including a cooled cavity plate having a rear surface and at least one opening therein into which the heated nozzles extend, the at least one opening having a surface which is spaced from the outer surfaces of the main portions of the heated nozzles, the improvement wherein;

each heated nozzle has an elongated flange portion with a front surface which provides a pair of mounting flanges extending outwardly in opposite directions adjacent the rear end of the heated nozzle, and an insulating and locating bushing extends between each mounting flange and the cooled cavity plate to accurately locate the heated nozzle and space the front surface of the flange portion from the rear surface of the cooled cavity plate.

2. Injection molding apparatus as claimed in claim 1 wherein each insulating and locating bushing has a rear end received in a matching opening in one of the flange portions, a front end received in a matching seat in the rear surface of the cavity plate, and an outwardly extending shoulder against which the front surface of the flange portion abuts, to space the flange portion from the cooled cavity plate and accurately locate the heated nozzles relative to the mold.

3. Injection molding apparatus as claimed in claim 2 wherein each insulating and locating bushing is hollow with a hole therethrough extending in alignment with a hole through the melt distribution manifold and a threaded bore in the cavity plate, and threaded mounting screws extends through the holes in the heated melt distribution manifold, the aligned holes in the insulating and locating bushings, and the aligned threaded bores in the cavity plate to secure the heated nozzles in place.

4. Injection molding apparatus as claimed in claim 3 wherein the cylindrical main portion and the elongated flange portion of each heated nozzle are integral.

5. Injection molding apparatus as claimed in claim 4 wherein the holes through the melt distribution manifold are sufficiently larger in diameter than the diameter of the mounting screws extending therethrough to allow the melt distribution manifold to slide relative to the cavity plate sufficiently to allow for thermal expansion and contraction of the elongated melt distribution manifold.

6. Injection molding apparatus as claimed in claim 5 wherein the elongated flange portion of each heated nozzle is rectangular with a width not substantially greater than the diameter of the cylindrical main portion of the heated nozzle.

* * * * *